United States Patent
Harada et al.

(10) Patent No.: US 11,087,149 B2
(45) Date of Patent: Aug. 10, 2021

(54) OBJECT DETECTION APPARATUS

(71) Applicant: DENSO CORPORATION, Kariya (JP)

(72) Inventors: Taketo Harada, Nisshin (JP);
Mitsuyasu Matsuura, Nisshin (JP);
Yosuke Miyamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/317,296

(22) PCT Filed: Jul. 11, 2017

(86) PCT No.: PCT/JP2017/025324
§ 371 (c)(1),
(2) Date: Jan. 11, 2019

(87) PCT Pub. No.: WO2018/012513
PCT Pub. Date: Jan. 18, 2018

(65) Prior Publication Data
US 2019/0228238 A1    Jul. 25, 2019

(30) Foreign Application Priority Data
Jul. 13, 2016    (JP) .............................. JP2016-138599

(51) Int. Cl.
*B60W 30/095* (2012.01)
*B60W 40/04* (2006.01)
*G06K 9/00* (2006.01)
*B60R 21/34* (2011.01)
*G08G 1/16* (2006.01)
(Continued)

(52) U.S. Cl.
CPC .......... *G06K 9/00805* (2013.01); *B60R 21/00* (2013.01); *B60R 21/34* (2013.01); *B60W 30/095* (2013.01); *B60W 40/04* (2013.01); *G06T 7/20* (2013.01); *G08G 1/16* (2013.01); *G06T 2207/30261* (2013.01)

(58) Field of Classification Search
None
See application file for complete search history.

(56) References Cited

U.S. PATENT DOCUMENTS

| | | |
|---|---|---|
| 2010/0217476 A1 | 8/2010 | Kindo et al. |
| 2013/0235201 A1 | 9/2013 | Kiyohara et al. |

(Continued)

FOREIGN PATENT DOCUMENTS

| | | |
|---|---|---|
| JP | 10-166976 A | 6/1998 |
| JP | 2005-041398 A | 2/2005 |

(Continued)

*Primary Examiner* — Dave Czekaj
*Assistant Examiner* — Samuel D Fereja
(74) *Attorney, Agent, or Firm* — Maschoff Brennan (57) ABSTRACT

An ECU is applied to a vehicle system that is provided with lateral sensors which acquire distance information expressing a distance to an object that is located at a position on a lateral side of a vehicle. When distance information on the object is acquired by the lateral sensors, a judgement is made by the ECU as to whether or not the object is a predetermined moving object that moves relative to the vehicle. The ECU determines that the object is a target to be subjected to contact avoidance processing for avoiding contact with the object, based on a result of judging whether or not the object for which the distance information is acquired is a moving object.

9 Claims, 5 Drawing Sheets

(51) Int. Cl.
  *B60R 21/00*    (2006.01)
  *G06T 7/20*     (2017.01)

(56) References Cited

U.S. PATENT DOCUMENTS

| 2016/0244054 A1 | 8/2016 | Kindo et al. |
| 2017/0101056 A1* | 4/2017 | Park .................... B60Q 9/008 |
| 2017/0358209 A1* | 12/2017 | Ohmori .................... B60T 7/22 |
| 2018/0033307 A1* | 2/2018 | Tayama .................... H04S 7/00 |

FOREIGN PATENT DOCUMENTS

| JP | 2008-174023 A | 7/2008 |
| JP | 2009-101733 A | 5/2009 |
| JP | 2009-234296 A | 10/2009 |
| JP | 2013-186668 A | 9/2013 |

* cited by examiner

OBJECT DETECTION APPARATUS

CROSS-REFERENCE TO RELATED APPLICATIONS

This application is a national stage application of PCT Application No. PCT/JP2017/025324, filed on Jul. 11, 2017, which claims priority to Japanese Patent Application No. 2016-138599 filed on Jul. 13, 2016, the disclosure of which is of which is incorporated herein by reference.

TECHNICAL FIELD

The present disclosure relates to an object detection apparatus that detects an object present on the lateral side of a vehicle by using a lateral sensor, which is an ultrasonic sensor or the like.

BACKGROUND ART

Conventionally, systems are proposed which include a distance measurement sensor such as an ultrasonic sensor installed in a vehicle, detect an object such as a preceding vehicle, a pedestrian, and an obstacle present around the vehicle, and support driving of the driver based on the result of detecting the object.

For example, in PTL 1, an involvement alarm device is disclosed which detects an obstacle that is likely to be involved when the vehicle turns. With this alarm device, when an obstacle is detected by an ultrasonic sensor that is provided to a side part of the vehicle, a lateral area is made bright by a light attached to a mirror of the vehicle. In that way, the driver is warned to exercise caution concerning the obstacle.

CITATION LIST

Patent Literature

[PTL 1] Japanese Patent Publication No. 2005-41398

SUMMARY OF THE INVENTION

In contact avoidance processing for avoiding contact by a vehicle with an object while the vehicle is travelling, a target object is detected based on distance information obtained from an ultrasonic sensor. Here, the contact avoidance processing includes the case in which contact between the vehicle and an object may occur due to involvement of the object by the vehicle. However, for example, when distance information on an oncoming vehicle is acquired by the ultrasonic sensor while the vehicle and the oncoming vehicle are passing each other, there is a risk that an unnecessary warning or the like may be executed based on that distance information. That is, it may be incorrectly judged that the oncoming vehicle is a target of the contact avoidance processing, with unnecessary contact avoidance processing being executed accordingly.

The present disclosure intends to overcome the above problem, and has a main objective of providing an object detection apparatus that can appropriately detect an object that is a target to be subjected to contact avoidance processing.

The present disclosure is of an object detection apparatus applied to a vehicle system which includes a lateral sensor that is provided to a side part of a vehicle and that transmits probe waves and receives reflected waves corresponding to the probe waves, and acquires distance information expressing a distance to an object that is located at a position on a lateral side of the vehicle, based on the reflected waves, the object detection apparatus detecting the object based on the distance information acquired by the lateral sensor; wherein the object detection apparatus includes a moving object judgement section that judges, when distance information on the object is acquired from the lateral sensor, whether or not the object is a predetermined moving object that is in movement relative to the vehicle, and a target object determination section that determines, based on a result of judging whether or not the object is the moving object, that the object is a target to be subjected to contact avoidance processing, which is executed for avoiding contact with the object.

While a vehicle is travelling, the vehicle may pass by the lateral side of an object on the road. In such a case, distance information on the object, located at the lateral side of the vehicle, is acquired by a lateral sensor, and a determination is made that the object is a target to be subjected to contact avoidance processing. When the vehicle passes the object, appropriate contact avoidance processing is executed, such as warning the driver that there is a target. However, when the vehicle and an oncoming vehicle pass each other, if distance information on the oncoming vehicle is obtained by the lateral sensor, there is a risk that unnecessary warnings and the like may be generated based on that distance information.

In this respect, with the above configuration, when distance information on the object is acquired by the lateral sensor, a determination as to whether the object is a target to be subjected to contact avoidance processing is made based on the result of judging whether or not the object is a predetermined moving object. In this case, a determination is made that the object is a target by integrating the distance information acquired by the lateral sensor with the result of judging whether or not the object is a predetermined moving object. For example, if it is judged that the object is a predetermined moving object, it is determined that the object is not a target. Accordingly, an object that is a target to be subjected to contact avoidance processing can be appropriately detected.

BRIEF DESCRIPTION OF THE DRAWINGS

The above and other objectives, features and advantages of the present disclosure will be made clearer from the following detailed description, referring to the appended drawings.

DESCRIPTION OF EMBODIMENTS

First Embodiment

Figure 1:
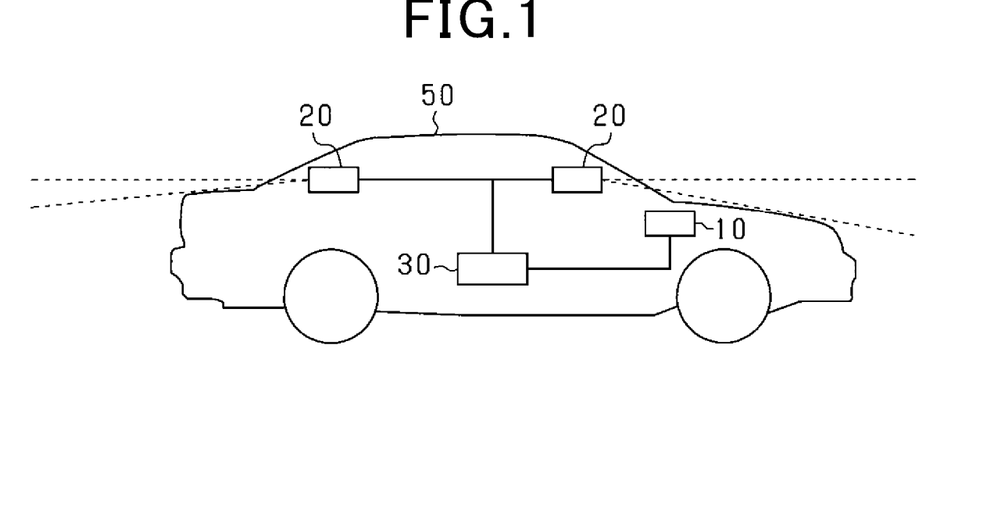
FIG. 1 is a diagram illustrating installation positions of an ultrasonic sensor and imaging cameras in a vehicle
Figure 2:
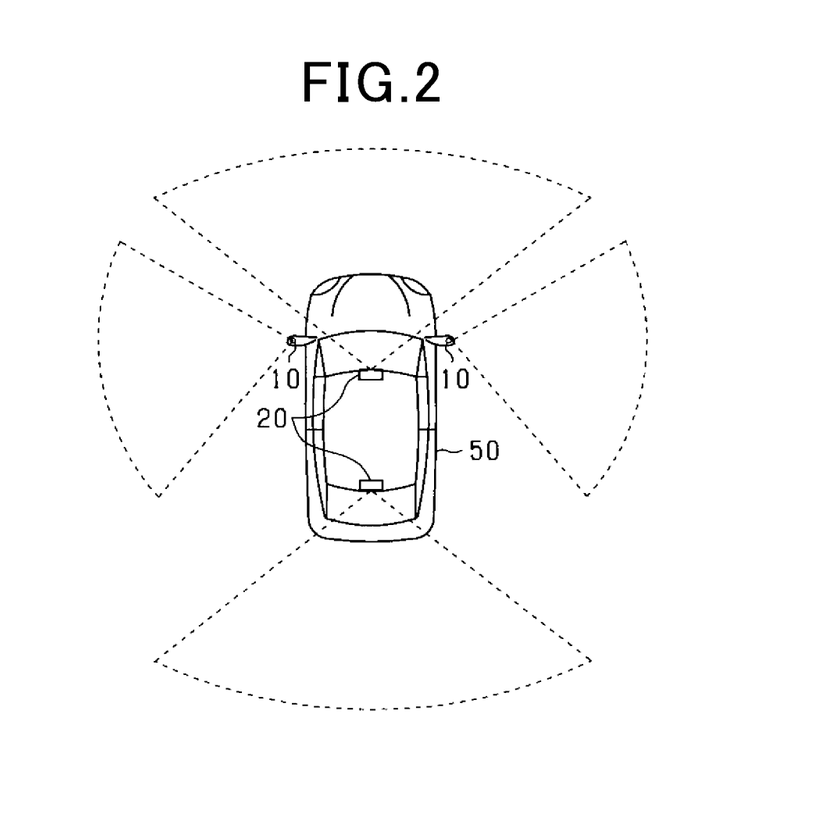
FIG. 2 is a diagram illustrating detection ranges of the ultrasonic sensors and the imaging cameras.

First, the general configuration of an object detection system for a vehicle according to the present embodiment will be described with reference to FIGS. 1 and 2.

An own vehicle 50 has ultrasonic sensors 10 serving as lateral sensors, imaging cameras 20 that captures images of areas around the own vehicle, and an ECU 30. The ultrasonic sensors 10 and the imaging cameras 20 are connected to the ECU 30, and output acquired information to the ECU 30 at predetermined intervals.

The ultrasonic sensors 10 transmit ultrasonic waves as probe waves at predetermined control intervals, and receive reflected waves that are reflected from objects. Based on a propagation time from transmission to reception, the distance between the own vehicle 50 and an object present around the own vehicle 50 is calculated. In this case, the propagation time is measured at the timing at which the voltage value of the reflected waves exceeds a predetermined threshold value. In the present embodiment, the ultrasonic sensors 10 are respectively attached to right-side and left-side parts (for example, door mirrors) of the own vehicle 50, and transmit ultrasonic waves sideward (in the lateral direction) from the own vehicle 50.

The imaging cameras 20 are single-lens cameras or stereo cameras, which have CCD image sensors, CMOS image sensors, near-infrared sensors, or the like. In the present embodiment, the imaging cameras 20 are respectively attached to a front part (for example, near the upper edge of a front windshield) and a rear part (for example near the upper edge of a rear window) of the own vehicle 50. The imaging camera 20 attached to the front part captures images of an area within a predetermined angular range that is directed in the traveling direction of the own vehicle 50, centered on the imaging axis. On the other hand, the imaging camera 20 attached to the rear part captures images of an area within a predetermined angular range that is directed rearward from the vehicle 50.

The ECU 30 is mainly configured of a computer including a CPU, various memories, and the like. Based on the distances to objects that are calculated by the ultrasonic sensors 10, the ECU 30 judges that an object is present on the lateral side of the own vehicle 50, and executes contact avoidance processing with respect to the object. The contact avoidance processing includes operating an alarm device for giving an alarm to the driver, and operating a braking unit. As control for the contact avoidance processing, the ECU 30 temporarily stores distance information on an object (the distance to the object) inputted from the ultrasonic sensors 10 in the memory as an information history, and executes the contact avoidance processing based on the information history. As a result, when the own vehicle 50 passes by the side of the object, the contact avoidance processing is executed continuously during the time period required for the passage.

It should be noted that the information history stored in the memory is successively updated by distance information that is inputted from the ultrasonic sensors 10, and that, together with storing new distance information as the information history based on a predetermined condition for storing, old distance information is deleted from the information history based on a predetermined condition for deletion. It would be equally possible to store in the memory, together with the distance information, the time points and the coordinates of the detection points at which the distance information on the object is acquired.

The ECU 30 also judges whether or not there is a moving object around the own vehicle, based on captured images from the imaging cameras 20. In the present embodiment, an object that moves relative to the own vehicle 50 is judged to be a moving object. Furthermore, in the present embodiment, the ECU 30 can judge the type of a moving object, for example, through pattern matching using dictionary information that has been registered beforehand, and can judge whether the moving object is either a vehicle (four-wheel automobile) other than the own vehicle 50, a motorcycle, a bicycle, or a pedestrian.

A method of recognizing a moving object by using a well-known optical flow can be applied, for example. Described simply, the ECU 30 acquires a plurality of time-series images that are captured by the imaging cameras 20, and based on that plurality of images, the ECU 30 calculates optical flows, that is, movement vectors on respective image coordinates. Then, the ECU reads the coordinates of start points and the coordinates of end points of the flows and the length of the flows obtained from the calculation results of the optical flow, and groups the movement vectors. Then, if the grouped optical flow has a predetermined magnitude in the image, the ECU 30 judges that there is an object. It should be noted that it would be equally possible to use a method other than the optical flow method, for detecting a moving object from a plurality of images.

In the contact avoidance control, a stationary object on a road shoulder, such as a guard rail, a side wall, and a parked vehicle, which are present on the road, is detected as an object located on the lateral side of the own vehicle 50, based on the outputs from the ultrasonic sensors 10, and the contact avoidance processing is executed for the stationary object on a road shoulder. Furthermore, when the own vehicle 50 turns (a right turn or a left turn), in order to prevent involving a pedestrian, a cyclist or the like, the presence of the pedestrian, the cyclist or the like is detected based on the outputs from the ultrasonic sensors 10, and the contact avoidance processing is executed with respect to the pedestrian, the cyclist or the like.

On the other hand, another vehicle may be traveling on the lateral side of the own vehicle 50. For example, when an oncoming vehicle or an overtaking vehicle is travelling in a traffic lane adjacent to the own traffic lane, another vehicle that is traveling is present on the lateral side of the own vehicle 50. Here, for example, when the own vehicle 50 and an oncoming vehicle pass each other, distance information on the oncoming vehicle is obtained by the ultrasonic sensors 10. Thereby, there is a risk that the contact avoidance processing is unnecessarily executed for the oncoming vehicle based on that distance information.

Figure 3:
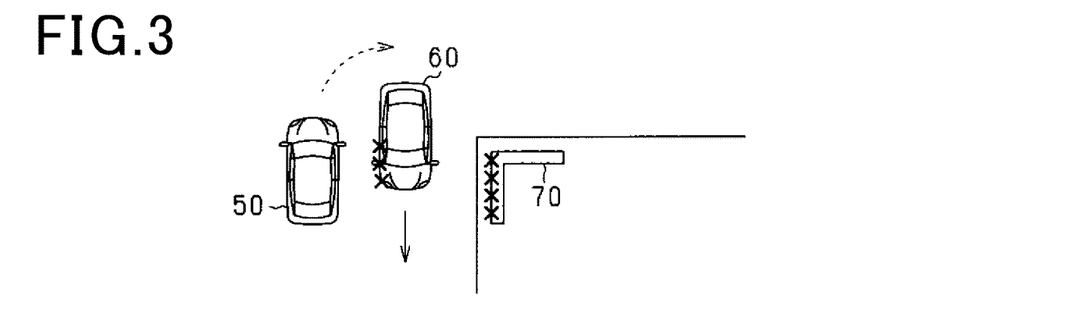
FIG. 3 is a diagram illustrating detection of an object in a scene in which an oncoming vehicle is passing.

FIG. 3 illustrates a scene in which the own vehicle 50 and an oncoming vehicle 60 pass each other while the own vehicle 50 is halted before turning right. In such a case, the ultrasonic sensors 10 acquire distance information on the oncoming vehicle 60, and there is a risk that contact avoidance processing is unnecessarily executed based on that distance information. That is, there is a risk that, each time the own vehicle 50 and the oncoming vehicle 60 passes each other in the condition shown in FIG. 3, unnecessary contact avoidance processing is executed. Hence, it is desirable that distance information on a moving object such as the oncoming vehicle 60 is not used in the contact avoidance control. On the other hand, it is necessary to appropriately use distance information for an object (for example, a road shoulder stationary object 70) which has a risk of contact due to involvement by the own vehicle 50.

In the present embodiment in that regard, when distance information on an object is acquired from the ultrasonic sensors 10, the ECU 30 judges whether or not the object (lateral object) is a predetermined moving object and, based on the result of the judgment, determines whether the object is a target to be subjected to the contact avoidance processing. If the object is then determined to be a target, the contact avoidance processing is executed. In this case, in particular, if the object is determined to be a predetermined moving object, it is made difficult for the object to be judged as a target, thereby endeavoring to restrict execution of the contact avoidance processing. That is, in judging whether or not the contact avoidance processing should be executed, the ECU 30 makes the judgment based on a combination (integration) of the distance information acquired from the ultrasonic sensors 10 and the object distance information that is obtained from images captured by the imaging cameras 20. It should be noted that, in the present embodiment, another vehicle such as an oncoming vehicle or an overtaking vehicle corresponds to a "predetermined moving object".

If it is judged that, for example, the object is an oncoming vehicle, the ECU 30 endeavors to make it difficult for the contact avoidance processing to be executed. Specifically, with respect to the information history that is stored in the memory, it is attempted to make it difficult for the distance information from the ultrasonic sensors 10 to be stored as the information history. More specifically, in a state in which the object is an oncoming vehicle that is approaching the own vehicle 50, a condition for storing the distance information from the ultrasonic sensors 10 as the information history is tightened. Furthermore, when the object is an oncoming vehicle that is in a state of moving away from the own vehicle 50, a condition for deleting the distance information from the information history which has already been stored is relaxed.

The way of tightening the condition for storing distance information as an information history will be described more specifically. In the present embodiment, the configuration is such that, when distance information is inputted from the ultrasonic sensors 10 to the ECU 30, if the number of times for which this continuously occurs reaches a predetermined number N, then the distance information is stored as an information history. With this configuration, the condition for storing distance information as an information history is tightened by increasing the predetermined number N. It should be noted that, as other means, it would be equally possible to use a configuration in which the ultrasonic sensors 10 are instructed to increase the threshold value of the reflected wave voltage, or the ultrasonic sensors 10 are instructed to reduce the amplification factor (gain) of the reflected wave voltage.

The way of relaxing the condition for deleting the distance information from the information history that has already been stored will be described more specifically. In the present embodiment, the configuration is such that, when a transition occurs from a state in which there is distance information, resulting from passage of an object, to a state in which there is no distance information, the concerned distance information is deleted from the information history at the time point when a predetermined time period T elapses from the time point when the state in which there is no distance information starts. With that configuration, the condition for deleting distance information from the information history is made relaxed by shortening the predetermined time period T. It should be noted that, as other means, it would be equally possible to use a configuration in which the concerned distance information is deleted from the information history at the time point when the travelling distance of the vehicle, which is measured from the time point when the state in which there is no distance information starts, reaches a predetermined distance L. In the configuration, shortening the predetermined distance L relaxes the condition for deleting the distance information from the information history.

History retention processing for retaining distance information as an information history will be described, with reference to the flow diagram in FIG. 4. The history retention processing is executed by the ECU 30 repeatedly at predetermined intervals.

In step S11, a decision is made as to whether the own vehicle 50 is turning, that is, making a right turn or a left turn. The judgement in step S11 is performed, for example, based on turn information of the own vehicle 50 including an operating signal of direction indicators or a steering signal, and a traveling speed of the own vehicle 50. If a YES decision is made in step S11, it is considered that there is a probability of contact with an object due to involvement, and the processing advances to step S12. If a NO decision is made in step S11, this execution of the processing is halted.

In step S12, a decision is made as to whether distance information on an object has been inputted from the ultrasonic sensors 10. If there is sensor input, the processing advances to step S13, and if there is no sensor input, the processing advances to step S17.

In step S13, a decision is made as to whether an object for which distance information has been acquired by the ultrasonic sensors 10 is a predetermined moving object such as an oncoming vehicle or an overtaking vehicle, and the object is in a state of approaching the own vehicle 50. If a NO decision is made in step S13, the processing advances to step S14 in which the distance information is stored as an information history, based on a predetermined reference condition.

If a YES decision is made in step S13, the processing advances to step S15. In step S15, the condition for storing the distance information as an information history is changed so as to become tight. Next in step S16, the distance information is stored as an information history, based on the condition after the change.

In step S17, a decision is made as to whether an object for which distance information has been obtained by the ultrasonic sensors 10 immediately therebefore is a predetermined moving object such as an oncoming vehicle or an overtaking vehicle, and the object is in a state of moving away from the own vehicle 50. If a NO decision is made in step S17, the processing advances to step S18 in which the concerned distance information is deleted from the information history, based on a predetermined reference condition.

If a YES decision is made in step S17, the processing advances to step S19. In step S19, the condition for deleting the distance information from the information history is changed so as to become more relaxed, then in succeeding step S20, the concerned distance information is deleted from the information history, based on the condition after the change.

It should be noted that steps S13~S20 correspond to a target determination section, which determines that an object is a target object of contact avoidance processing.

The following advantageous effects are obtained from the above detailed embodiment.

When the vehicle and an oncoming vehicle pass each other, for example, if distance information on the oncoming vehicle is obtained by the ultrasonic sensors 10, there is a risk that an unnecessary warning or the like may be issued based on that distance information. From consideration of this point, with the above configuration, when distance information expressing the distance to an object is obtained by the ultrasonic sensors 10, a determination that the object is a target to be subjected to the contact avoidance processing is made based on the result of the judgement whether or not the object is a predetermined moving object. Specifically, if the object is judged to be a moving object, it is made difficult for the object to be judged as a target, to thereby make it difficult for the contact avoidance processing to be executed. In this case, a determination as to whether the object is a target is performed by integrating the distance information obtained by the ultrasonic sensors 10 with the result of judging whether or not the object is a predetermined moving object. For example, if the object is a predetermined moving object, the object is not determined to be a target. In this way, objects that are targets to be subjected to the contact avoidance processing can be suitably detected.

Furthermore, if an object is judged to be a moving object, it is made difficult for the distance information from the ultrasonic sensors 10 to be retained as an information history. By omitting retaining the distance information from the ultrasonic sensors 10 as an information history, it becomes difficult for the contact avoidance processing to be performed, and execution of unnecessary operations can be suitably reduced.

For preventing execution of unnecessary operations of the contact avoidance processing when there is an oncoming vehicle, for example, distance information from the ultrasonic sensors 10 may not be stored as an information history while the oncoming vehicle is approaching. Furthermore, the information history that has already been stored may be deleted when the oncoming vehicle moves away. In this respect, in a situation in which an oncoming vehicle is approaching the own vehicle, the condition for storing distance information as an information history is made tight, and together with this, in a situation in which the oncoming vehicle is moving away from the own vehicle, the condition for deleting the distance information that has already been stored as an information history is relaxed. In this way, it becomes possible to optimize the information history that is used when the contact avoidance processing is executed.

The judgement as to whether an object is a moving object is made based on at least one of an image of an area located ahead of and in the traveling direction of the vehicle and an image of an area located on the lateral side of the vehicle, the images being captured by the imaging cameras 20. In this way, it becomes possible to accurately detect a moving object that passes by the lateral side of the own vehicle 50.

With the above configuration, the object present on the lateral side of the own vehicle 50 is determined to be a target if it is judged that there is a probability of contact with the object due to involvement, taking into consideration that there is a concern about involvement of an object while the vehicle is turning. Execution of unnecessary operations, in an involvement scene when the vehicle is turning, can thereby be reduced.

Second Embodiment

A second embodiment will be described next, with the description centered on differences from the first embodiment. In the second embodiment, moving object parameters (such as a movement direction and a movement speed) are acquired in moving object detection, and based on the moving object parameters, a determination is made as to whether an object is a target to be subjected to the contact avoidance processing.

The ECU 30 judges that an object is a moving object that passes the lateral side of the own vehicle 50, and determines that the object is a target based on at least one of the movement direction and the movement speed of the moving object. In this case, concerning the movement direction of the moving object, the determination that the object is a target is made based on the movement direction of the moving object relative to the movement direction of the own vehicle 50, that is, the angle θ of the movement direction of the moving object relative to the movement direction of the own vehicle 50. For example, the target determination is performed such that execution of the contact avoidance processing is made difficult if the slope of the movement direction of the moving object relative to the movement direction of the own vehicle 50 is small, that is, if the angle θ is small. That is, retention of the distance information as an information history is made difficult. It should be noted that, in making it difficult for the distance information to be stored as an information history, the condition for deleting from the information history the distance information that has already been stored is relaxed, together with tightening the condition for storing the distance information as an information history, as described above.

Furthermore, concerning the movement speed of a moving object, if, for example, the movement speed of the moving object is low, the determination of a target is executed such as to make it difficult for the contact avoidance processing to be executed compared to the case where the movement speed of the moving object is high. That is, it is made difficult for the distance information to be retained as an information history.

Figure 4:
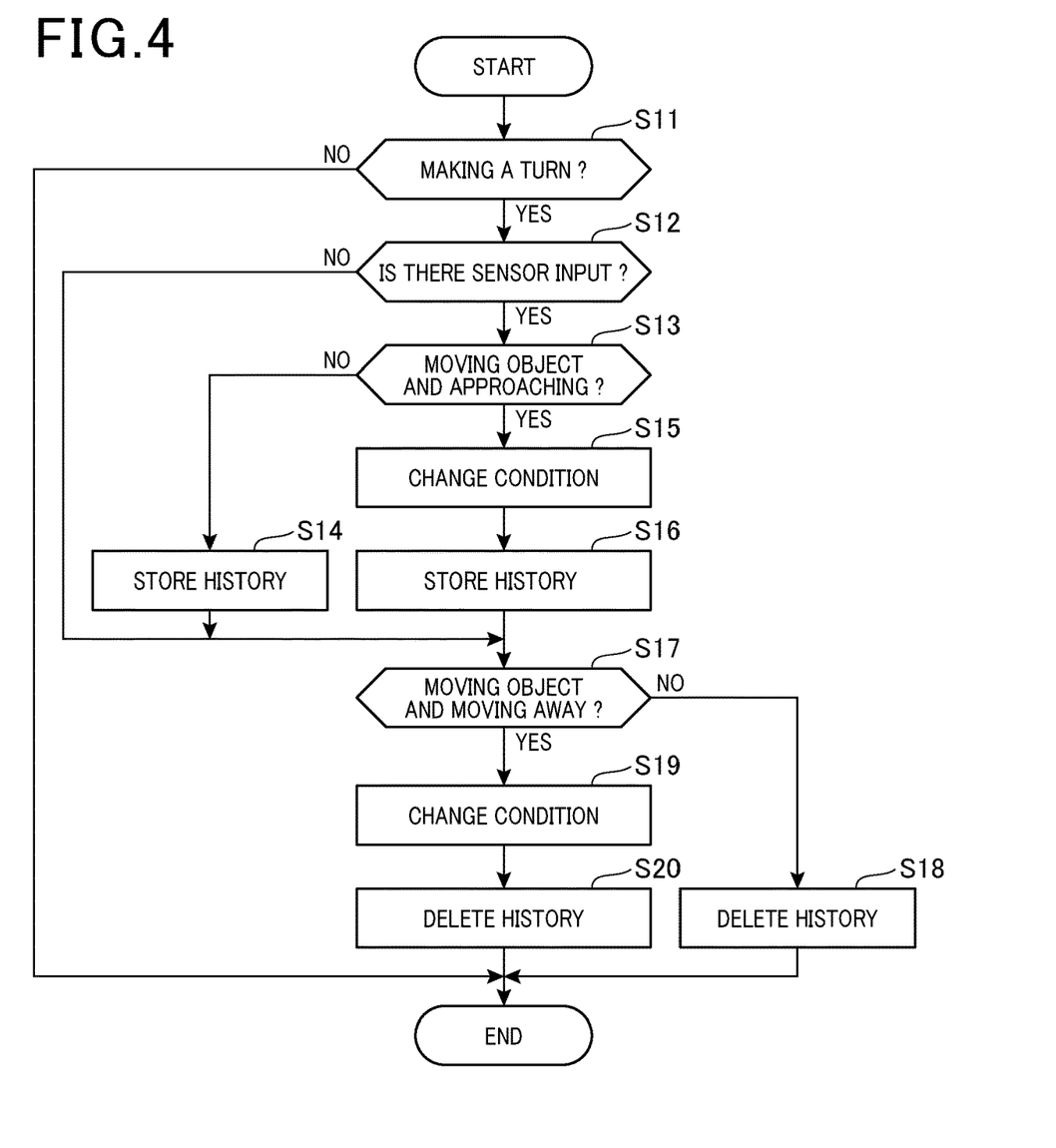
FIG. 4 is a flow diagram of a procedure of history retention processing.
Figure 5:
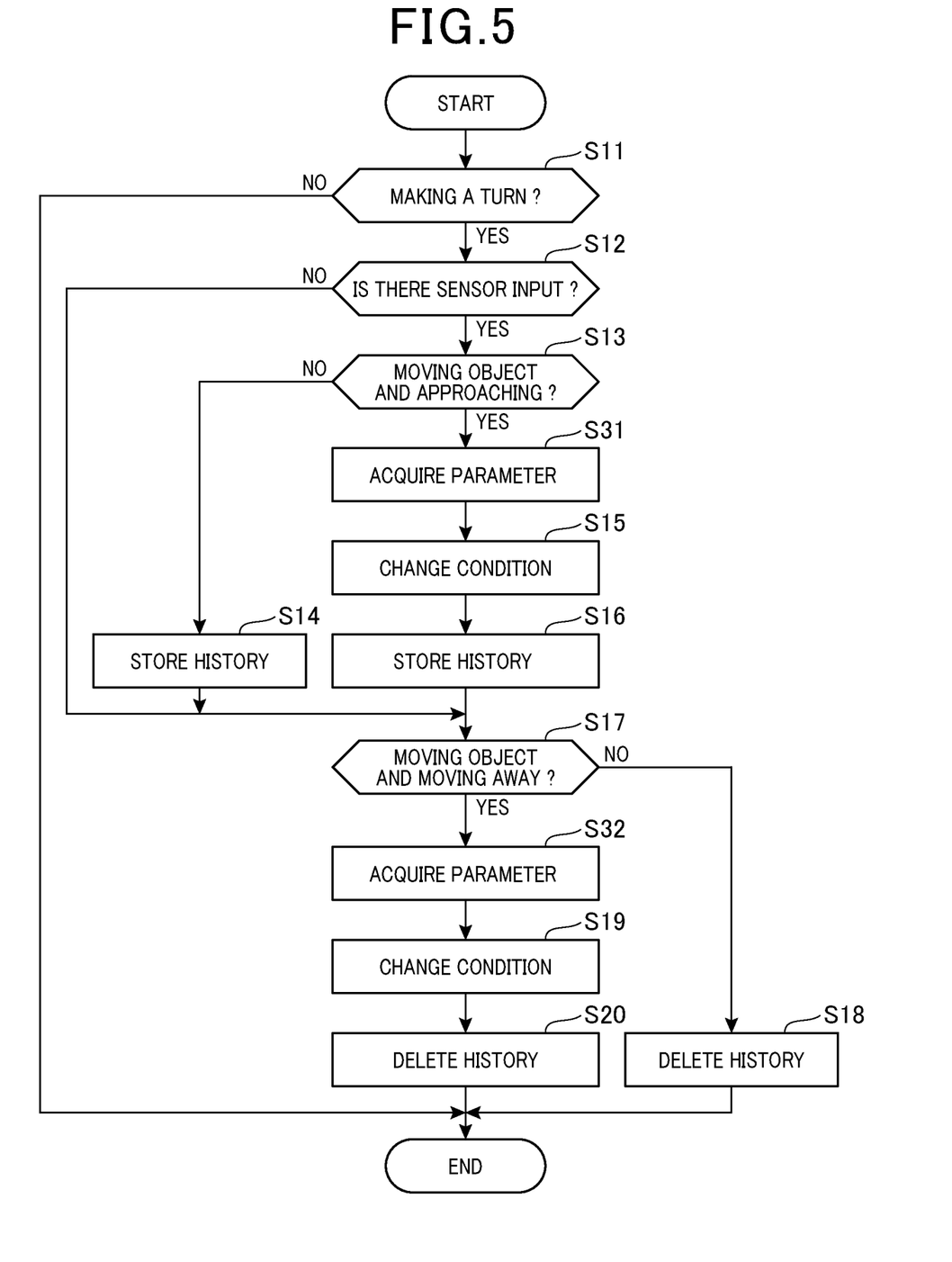
FIG. 5 is a flow diagram of a procedure of history retention processing according to a second embodiment.

FIG. 5 is a flow diagram of a procedure of history retention processing according to the second embodiment, which is executed repeatedly at predetermined intervals by the ECU 30 in place of the above processing in FIG. 4. In FIG. 5, processing similar to that in FIG. 4 is assigned the same step numbers to simplify the description. Changes from the processing in FIG. 4 are addition of steps S31 and S32 and changes of the processing contents of steps S15 and S19.

In FIG. 5, in a case in which the own vehicle 50 is turning, and distance information on an object is inputted from the ultrasonic sensors 10, and furthermore in which a predetermined moving object is in a state of approaching the own vehicle 50 (the case in which a YES decision is made in each of steps S11, S12, S13), the processing advances to step S31. In step S31 the moving object parameters are acquired. At least one of the movement direction and the movement speed of the moving object is acquired as the moving object parameter.

It should be noted that the movement direction of the moving object is obtained, for example, as the slope of the movement direction of the moving object relative to the movement direction of the own vehicle 50, by using the direction of the vector of the optical flow of the moving object. Furthermore, the movement speed of the moving object is obtained, for example, by using the length of the vector of the optical flow of the moving object and the time between captured images, or the like.

Figure 6:
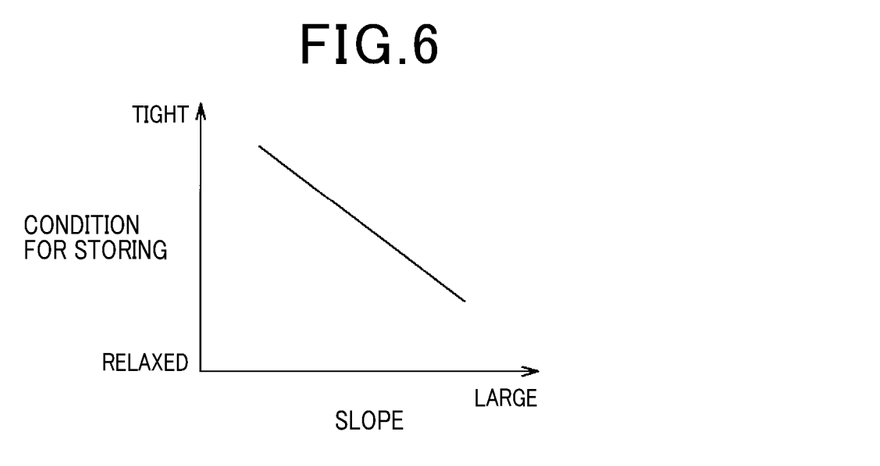
FIG. 6 is a diagram illustrating a relationship between a slope of the direction of movement of a moving object and a condition for storing.

Next, in step S15, the condition for storing the distance information as information history is changed so as to become tight, in accordance with either the movement direction or the movement speed of the moving object. Here, the relationship between the slope of the movement direction of the moving object and the condition for storing is, for example, as shown in FIG. 6. In FIG. 6, when the slope is small, the condition for storing is changed so as to be tighter than that when the slope is large. When the slope is small, it can be considered that the moving object is an oncoming vehicle, and since in that state it can be assumed that the probability of contact with the own vehicle 50 is low, such a relationship is used in the present embodiment. As a result, when the slope is small, the distance information becomes more difficult to retain as an information history than that when the slope is large. As a result, the contact avoidance processing becomes difficult to execute.

Figure 7:
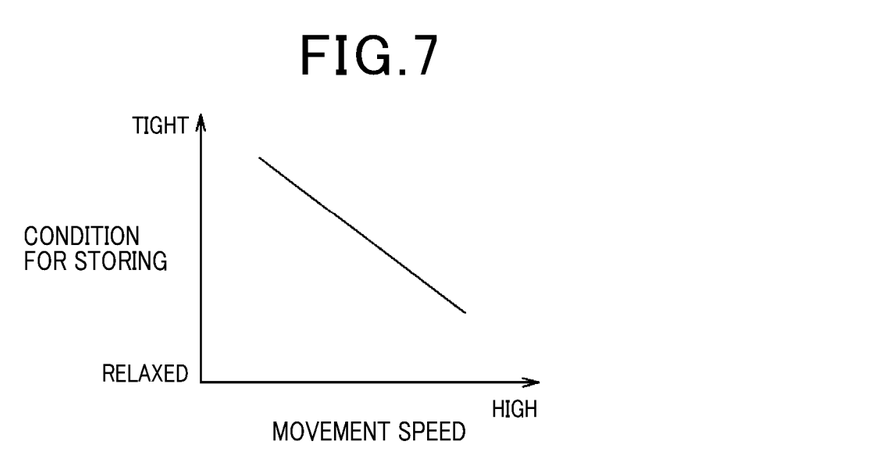
FIG. 7 is a diagram illustrating a relationship between movement speed of the moving object and the condition for storing.

Furthermore, the relationship between the movement speed of a moving object and the condition for storing is shown in FIG. 7, for example. In FIG. 7, when the movement speed is low, the condition for storing is changed so as to be tighter than that when the movement speed is high. When the movement speed is low, since the occasions when distance information is inputted to the ECU 30 will increase, it can be considered that the contact avoidance processing will be readily executed. Hence, when the movement speed is low, it is made difficult for the contact avoidance processing to be executed, by making it difficult for the distance information to be stored. Next in step S16, based on the condition after the change, the distance information is stored as an information history.

Furthermore, in a case in which a predetermined moving object is in a state of moving away from the own vehicle 50 (the case of YES in step S17), the processing advances to step S32. Here, in the way similar to step S31 described above, at least one of the movement direction and the movement speed of the moving object is obtained as a moving object parameter. Thereafter, in step S19, the condition for deleting distance information from the information history is changed so as to be relaxed, in accordance with either the movement direction or the movement speed of the moving object.

Figure 8:
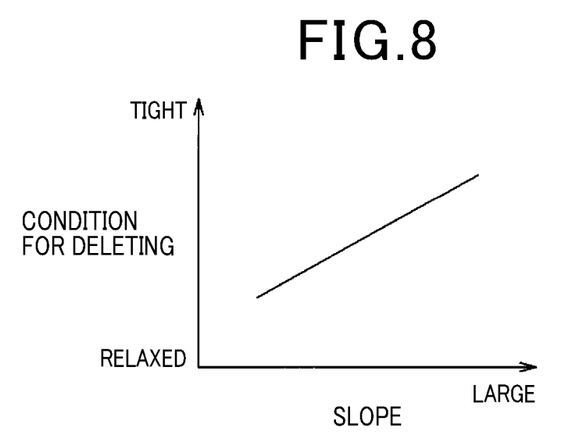
FIG. 8 is a diagram illustrating a relationship between a slope of the direction of movement of the moving object and a condition for deletion.

Here, the relationship between the condition for deletion and the slope of the movement direction of the moving object is shown in FIG. 8. In FIG. 8, when the slope of the movement direction is small, the condition for deletion is changed so as to be more relaxed than that when the slope of the movement direction is large. Due to this, in the way similar to that in FIG. 6, when the slope is small, it becomes more difficult for the distance information to be retained as an information history than that when the slope is large. As a result, the contact avoidance processing becomes difficult to execute.

Figure 9:
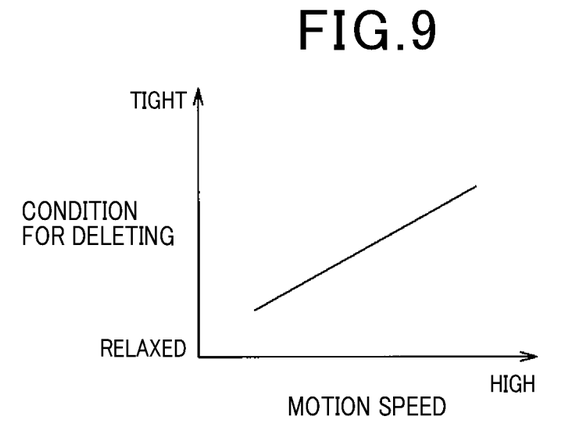
FIG. 9 is a diagram illustrating a relationship between movement speed of the moving object and the condition for deletion.

Furthermore, the relationship between the movement speed of a moving object and the condition for deletion is shown in FIG. 9, for example. In FIG. 9, when the movement speed is low, the condition for deletion is changed so as to be more relaxed than that when the movement speed is high. Due to this, the way similar to that in FIG. 7, when the movement speed is low, it becomes more difficult for the distance information to be retained as an information history than that when the movement speed is high. As a result, the contact avoidance processing becomes difficult to execute.

In succeeding step S20, the distance information is deleted from the information history, based on the condition after the change.

As described above, a determination that an object is a target is made based on at least one of the movement speed and the movement direction of the moving object. In this case, the contact avoidance processing can be implemented in accordance with a probability of contact, taking into consideration that the degree of the probability of contact with the own vehicle 50 varies depending on the movement direction and the movement speed of the moving object.

Furthermore, it would be equally possible for the ECU 30 to judge the manner in which an object passes, as a moving object, by the lateral side of the own vehicle 50, from among manners in which the object and the own vehicle 50 pass each other, the object overtakes the own vehicle 50, and the object obliquely approaches the own vehicle 50, and to determine the object to be a target based on the result of the judgement, that is, the passing, overtaking, or oblique approaching. The judgement as to whether the manner is the passing, overtaking, or obliquely approaching may be performed by using the optical flow of the moving object. In this case, for example, the determination of a target may be performed such that it becomes more difficult for the contact avoidance processing to be executed, in the order: passing, overtaking, and obliquely approaching. That is, it becomes more difficult for distance information to be stored as an information history, in the order: passing, overtaking, and obliquely approaching. With the above configuration, appropriate contact avoidance processing can be implemented in accordance with the degree of a probability of contact, taking into consideration that the probability of contact of the own vehicle 50 with a moving object varies depending on the manner in which the moving object passes the own vehicle 50.

The present disclosure is not limited to the above embodiments, and may be implemented, for example, as below.

In the above embodiment, a configuration is used in which the distance information acquired by the ultrasonic sensors 10 is stored as an information history based on a predetermined condition for storing. In this respect, it would be equally possible to use a configuration in which, when an object for which distance information has been acquired by the ultrasonic sensors 10 is a predetermined moving object, the ECU 30 does not store the distance information, irrespective of the condition for storing.

In the above embodiment, a configuration is used in which the distance information that has been stored as an information history is deleted based on a predetermined condition for deletion. In this respect, it would be equally possible to use a configuration in which, when an object for which distance information has been acquired by the ultrasonic sensors 10 is a predetermined moving object, that is, when an object for which distance information has been acquired by the ultrasonic sensors 10 and a moving object for which images have been captured by the imaging cameras 20 are the same object, all of the distance information on the object is deleted (erased) from the information history, on condition that no distance information on the object has been inputted at the current time point. With this configuration, the distance information on a predetermined moving object can be excluded from the information history, so that unnecessary warnings and the like can be suppressed.

It would be equally possible to use a modified configuration in which the time at which a moving object will pass by the lateral side of the own vehicle 50 is predicted, and in which, when the condition for storing distance information as an information history is changed, the condition is temporarily changed at the predicted time. In this case, means may be provided for predicting the time at which a moving object will pass by the lateral side of the own vehicle 50, for example, based on the movement speed of the moving object or the like. With this configuration, storing of distance information on a moving object as an information history can be prevented, whereby the information history can be optimized.

It is only necessary for the distance information to include information related to distance, and it would be equally possible for the distance information to include, for example, in addition to or instead of the distance from the own vehicle 50 to the object, the time at which the distance information was acquired, or the coordinates of the detection point.

In the above embodiment, a configuration is used in which the imaging cameras 20 are provided at front and rear parts of the own vehicle 50. However, this is not limitation, and it would be equally possible to provide imaging cameras 20 at side parts of the own vehicle 50. In this case, imaging cameras 20 may be respectively provided at the front part and both the side parts. If provided at the side parts, the imaging cameras 20 may be attached near the upper edges of the side windows. With this configuration, since a moving object that is passing by the lateral side of the own vehicle 50 can be directly captured by the imaging cameras 20, it can be suitably judged whether or not an object for which distance information is acquired is a moving object.

In the above embodiment, the ultrasonic sensors 10 are used as distance sensors. However, there is no specific limitation, and it is only necessary for the distance sensors to have a capability of transmitting and receiving probe waves. It would be equally possible, for example, to use a configuration that employs a millimeter-wave radar, a laser radar, or the like.

In the above embodiment, the imaging cameras 20 are used as imaging units for capturing images of an area around the own vehicle 50. However, there is no specific limitation, and it is only necessary to use a unit that is capable of detecting moving objects. It would be equally possible, for example, to employ a configuration using a laser radar or the like.

The present disclosure has been described referring to the embodiments. However, it should be understood that the present disclosure is not limited to the embodiments and the configurations thereof. The present disclosure includes various modified examples and modifications within the range of equivalency. In addition, various combinations and forms, and other combinations and forms in which one or more or less elements are included in the various combinations and forms are also within the scope and the range of the idea of the present disclosure.

The invention claimed is:

1. An object detection apparatus applied to a vehicle system which includes a lateral sensor that is provided to a side part of a vehicle and that transmits probe waves and receives reflected waves corresponding to the probe waves, and the lateral sensor acquires distance information expressing a distance to an object that is located at a position on a lateral side of the vehicle, based on the reflected waves, the object detection apparatus detecting the object based on the distance information acquired by the lateral sensor, the object detection apparatus comprising:

a moving object judgement section configured to judge, based on the distance information on the object acquired from the lateral sensor, whether the object is a moving object that is in movement relative to the vehicle; and a target object determination section configured to determine whether the object is a target to be subjected to contact avoidance processing, which is executed for avoiding contact with the object, wherein the target object determination section adjusts a condition that inhibits the object from being determined to be a target to be subjected to contact avoidance processing in response to the object being judged to be a predetermined type of moving object, and the condition comprises a threshold that determines whether to store or delete the distance information as information history, in which contact avoidance processing is executed with respect to the object based on the information history.

2. The object detection apparatus according to claim 1, wherein in response to the object being judged to be a predetermined type of moving object and the object being in a state of approaching the vehicle, the target object determination section increases the threshold that determines whether to store the distance information as the information history.

3. The object detection apparatus according to claim 1, wherein in response to the object being judged to be a predetermined type of moving object and the object being in a state of moving away from the vehicle, the target object determination section decreases the threshold that determines whether to delete the distance information from the information history, which has already been stored.

4. The object detection apparatus according to claim 1, wherein the moving object judgement section judges whether the object is a moving object that passes by a lateral side of the vehicle, and the target object determination section makes a determination that the object is a target object based on at least one of a movement direction and a movement speed of the object.

5. The object detection apparatus according to claim 1, wherein the moving object judgement section judges a manner in which the object passes by the lateral side of the vehicle, from among manners in which the object and the vehicle pass each other, the object overtakes the vehicle, and the object obliquely approaches the vehicle, and the target object determination section determines the object to be a target based on the manner in which the object passes.

6. The object detection apparatus according to claim 1, wherein the object detection apparatus is applied to the vehicle provided with an imaging unit which captures an image of an area around the vehicle, and the moving object judgement section judges whether the object is a moving object based on at least one of an image of an area located ahead of and in a traveling direction of the vehicle and an image of an area located on the lateral side of the vehicle, the images being captured by the imaging unit.

7. The object detection apparatus according to claim 1, further comprising an involvement judgement section configured to judge whether there is a probability of contact with the object due to involvement while the vehicle is turning, based on a travel speed of the vehicle and turning information, wherein in response to judging that there is a probability of contact with the object due to the involvement, the target object determination section determines that the object is a target to be subjected to contact avoidance processing.

8. A method of avoiding contact between a vehicle and objects detected using a lateral sensor positioned on a lateral side of the vehicle, the lateral sensor configured to transmit probe waves and receive reflected waves corresponding to the probe waves, the lateral sensor configured to acquire distance information, based on the reflected waves, regarding a distance to an object that is located on the lateral side of the vehicle, the method comprising:

judging, based on the distance information on the object, whether the object is moving relative to the vehicle;

determining, whether the object is a target to be subjected to contact avoidance processing by the vehicle, which is executed to avoid contact with the object; and adjusting a condition that inhibits the object from being determined to be a target to be subjected to contact avoidance processing in response to the object being judged to be a predetermined type of moving object, wherein the condition comprises a threshold that determines whether to store or delete the distance information as information history, in which contract avoidance processing is executed with respect to the object based on the information history.

9. A system for avoiding contact between a vehicle and objects detected using a lateral sensor positioned on a lateral side of the vehicle, the lateral sensor configured to transmit probe waves and receive reflected waves corresponding to the probe waves, the lateral sensor configured to acquire distance information, based on the reflected waves, regarding a distance to an object that is located on the lateral side of the vehicle, the system comprising:

a central processor;

a non-transitory computer-readable storage medium; and a set of computer-executable instructions stored on the non-transitory computer-readable storage medium that cause the central processor to implement:

judging, based on the distance information on the object, whether the object is moving relative to the vehicle;

determining, whether the object is a target to be subjected to contact avoidance processing by the vehicle, which is executed to avoid contact with the object; and adjusting a condition that inhibits the object from being determined to be a target to be subjected to contact avoidance processing in response to the object being judged to be a predetermined type of moving object, wherein the condition comprises a threshold that determines whether to store or delete the distance information as information history, in which contact avoidance processing is executed with respect to the object based on the information history.

* * * * *